United States Patent
Stapleton

[15] 3,695,749
[45] Oct. 3, 1972

[54] APPARATUS FOR PRODUCING AN INTERFERENCE PATTERN

[72] Inventor: Thomas T. Stapleton, Bloomfield Hills, Mich.

[73] Assignee: General Motors Corporation, Detroit, Mich.

[22] Filed: Aug. 7, 1970

[21] Appl. No.: 62,012

[52] U.S. Cl. ................. 350/163, 350/3.5, 350/162, 350/320
[51] Int. Cl. .......................................... G02b 27/00
[58] Field of Search ............... 350/3.5, 162, 163, 320; 356/106

[56] References Cited

UNITED STATES PATENTS

| | | | |
|---|---|---|---|
| 3,507,564 | 4/1970 | Franks | 350/320 |
| 3,493,288 | 2/1970 | Kaufman et al. | 350/163 |
| 3,578,845 | 5/1971 | Brooks et al. | 350/162 R |

OTHER PUBLICATIONS

Burch et al., " Interferometric Methods for the Photographic Production of Large Gratings," Optica Acta, Vol. 1, No. 1, Jan. 1961, pp 73– 80.

*Primary Examiner*—David Schonberg
*Assistant Examiner*—Toby H. Kusmer
*Attorney*—Jean L. Carpenter, Paul Fitzpatrick and Warren D. Hill

[57] ABSTRACT

A beam splitter and a mirror form from a laser beam a pair of converging collimated beams directed to the primary focal point of a spreading lens. The lens combines and spreads the beams so that they overlap to produce an interference zone. A device is provided for adjustably moving the above-mentioned optical elements to vary the fringe spacing of the interference pattern.

4 Claims, 4 Drawing Figures

INVENTOR.
Thomas T. Stapleton
BY
Warren D. Hill
ATTORNEY

APPARATUS FOR PRODUCING AN INTERFERENCE PATTERN

This invention relates to an optical apparatus for producing an interference pattern and especially to such an apparatus for producing a uniform pattern of straight interference fringes which can be adjustably spaced.

It has been known to produce an interference pattern from a laser beam by splitting the beam with a beam splitter and reflecting one of the split beams at an angle to the other and placing a spreading lens in each of the split beams so that the beams will diverge and overlap to provide an interference pattern when projected on a surface. Fringe spacing in the interference pattern was controlled by adjusting the angle at which the two beams converged. A serious drawback of that arrangement was that it was physically impossible to arrange the spreading lenses close enough to obtain a coarse fringe spacing and at the same time spread the beams over a large angle. This drawback can be overcome by combining the split beams with a second beam splitter after passing through the spreading lenses. A serious objection to that arrangement is that 50 percent of the available light is wasted.

It is therefore an object of the present invention to provide apparatus for producing an interference pattern of coarse spacing which uses all the available light.

Another object of the invention is to provide efficient apparatus for producing a coarse pattern of linear interference fringes over a large surface.

A further object of the invention is to provide a device for easily adjusting the fringe spacing in an interference apparatus.

The invention is carried out by providing a beam splitter for splitting a laser beam and a mirror for reflecting one of the beams into an acute converging angle with the other beam and a single spreading lens having its primary focal point at the point of convergence of the split beams for spreading the beams and combining them in an overlapping manner.

The invention is further carried out by providing a mechanical device for adjustably moving the beam splitter and mirror to change the convergence angle of the split beams and for positioning the lens to maintain its primary focal point at the point of convergence of the beams.

The above and other advantages will be made more apparent from the following specification taken in conjunction with the accompanying drawings wherein like reference numerals refer to like parts and wherein.

Figure 1:
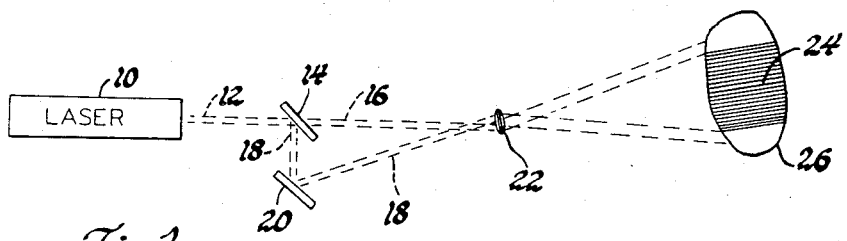
FIG. 1 is a schematic representation of an apparatus according to the invention for producing an interference pattern of an object.
Figure 2:
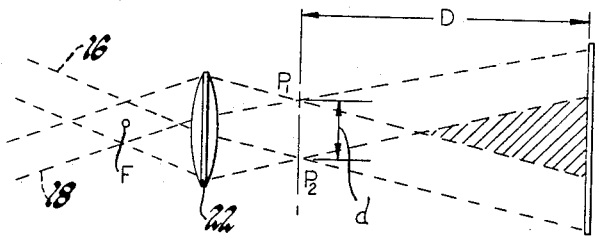
FIG. 2 is a light ray diagram illustrating the operation of the apparatus of FIG. 1.

Referring to FIGS. 1 and 2, a laser 10 provides a collimated beam 12 of coherent monochromatic light. A beam splitter 14 in the path of the beam 12 splits the beam 12 into a second beam 16 and a third beam 18. A mirror 20 reflects the third beam 18 into convergence with the second beam 16 at an acute angle. A positive spreading lens 22 in the path of both beams 16 and 18 is so positioned that its primary focal point F lies at the intersection of the central ray of beams 16 and 18. Each beam 16 and 18 is then focused in the back focal plane of the lens 22 at points $P_2$ and $P_1$, respectively. From those points $P_1$ and $P_2$, the beams diverge to become cones of light which overlap to produce an interference pattern as indicated at 24 on an object 26 onto which the beams are projected. The central ray of each beam becomes the axis of its respective cone of light. Since the central ray passes through the focal point of the lens, the axis of each cone of light will be parallel to the axis of the lens. Therefore, two cones of light are created whose axes are parallel.

Fringe spacing in the interference pattern depends on the separation d between the points $P_1$ and $P_2$ and the distance D from those points to the point of observation. If the distance to the point of observation is large compared to the separation then the fringe spacing s is given approximately by $$s = (\lambda D / d)$$

where $\lambda$ is the wavelength of the light. In a typical application, the object 26 to be illuminated is placed about a meter from the lens 22 and the desired fringe spacing is 0.1 millimeters. Where the wavelength is $6.33 \times 10^{-4}$ millimeters, the required separation of $P_1$ and $P_2$ would then be $$d = \frac{\lambda D}{s} = \frac{6.33 \times 10^{-4} \times 1000}{0.1} = 6.33 \text{ millimeters.}$$

Figure 3:
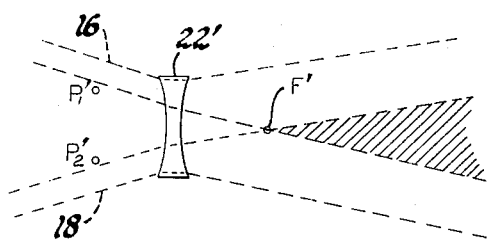
FIG. 3 is a light ray diagram illustrating a modified form of the apparatus of FIG. 1 and its operation.

FIG. 3 illustrates only a portion of the system which is the same as the system of FIG. 1 except that a negative lens 22' is substituted for the positive lens 22. The laser beams 16 and 18 then are directed toward the primary focal point F' of the lens 22' which is to the right of the lens as seen in FIG. 3 because the lens has a negative focal length. The expression "primary focal point" means, as used in this specification and claims in the context of FIGS. 1, 2 and 3 of the drawings, that point at which collimated light incident on the right face of the lens and having a central ray on the principal axis of the lens is focused or appears to be focused. Thus the beam 16 which is directed toward the primary focal point F' is diverged by the lens 22' into a truncated cone which appears to have its apex at point $P_1'$ and the central ray of the cone is parallel to the axis of the lens. In a simular manner the beam 18 is diverged by the lens into a truncated cone having its apparent apex at point $P_2'$ and the two cones overlap and an interference pattern is created in the overlapping area.

Figure 4:
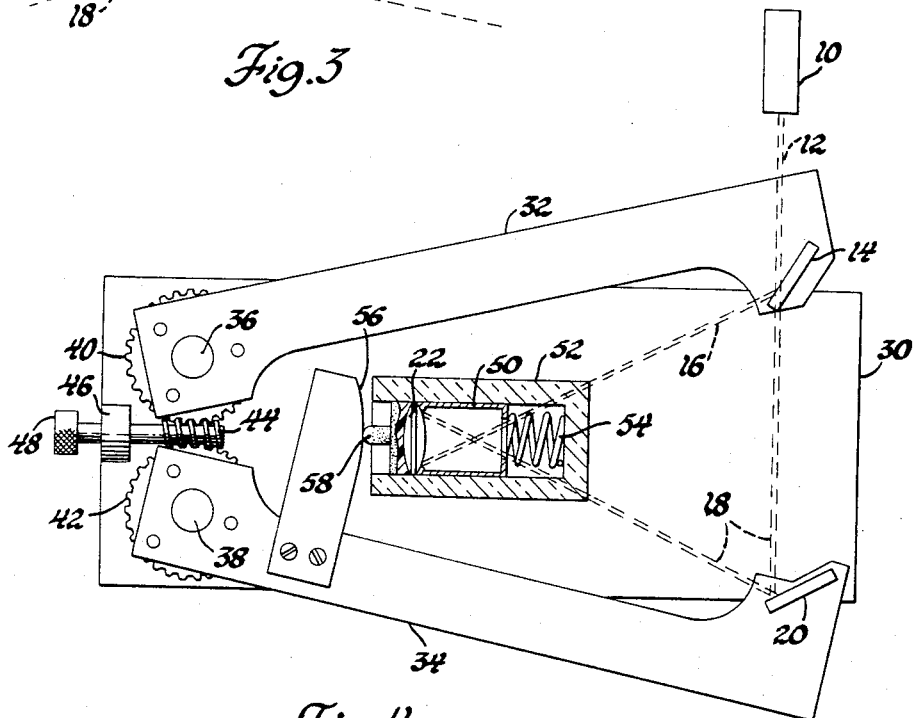
FIG. 4 is a plan view of a device according to the invention for supporting and adjusting the optical elements of the apparatus of FIG. 1 for effecting adjustment of interference fringe spacing.

In both embodiments of the apparatus described herein, the separation d of $P_1$ and $P_2$ or $P_1'$ and $P_2'$ can be adjusted by adjusting the angle of convergence of the beams 16 and 18 in order to effect a change in the fringe spacing s. A device for supporting the optical elements and adjusting them for variation of fringe spacing is illustrated in FIG. 4. That device comprises a base or platform 30 carrying arms 32 and 34, each secured to the base by a pivot member 36 and 38, respectively. Worm wheels 40 and 42 are rigidly attached to each arm 32 and 34 respectively at the pivoted ends and a worm 44 journalled to the base 30 at 46 engages both worm wheels 40 and 42. A knob 48 affixed to the worm permits manual turning of the worm. Thus by turning the knob 48, the arms 32 and 34 are caused to pivot equal amounts in opposite directions. A lens 22 mounted on a carriage 50 is supported on the base midway between the arms 32 and 34 in a carriage guide 52 which permits movement of the lens along its axis. A spring 54 biases the carriage 50 and the lens 22 to the left. A cam 56 rigidly attached to the arm 34 abuts a cam follower 58 on the carriage 50 to axially position the lens 22 according to the position of the arm 34.

The free end of the arm 32 carries the beam splitter 14 in the path of the laser beam 12 from the laser 10. The beam 16 from the beam splitter is directed through the primary focal point F and the lens 22. The free end of the arm 32 carries the mirror 20 which reflects the beam 18 through the focal point F and the lens 22 whereupon an interference pattern is formed as described above. When the knob 48 is turned and the arms 32 and 34 are adjusted to a new angle, the beams 16 and 18 will then converge at a new angle but their point of intersection will not necessarily remain in the same position. For this reason the cam 56 is provided to allow axial adjustment of the lens 22 in accordance with the position of the arm 34 so as to move the lens 22 such that its focal point will be positioned at the point of convergence of the beams 16 and 18. The cam 56 is therefore shaped specifically to maintain that relationship. It will thus be seen that as the arms 32 and 34 are angularly adjusted, the beams 16 and 18 will likewise be angularly adjusted so that the fringe spacing in the interference pattern will be altered.

The embodiment of the invention described herein is for purposes of illustration and the scope of the invention is intended to be limited only by the following claims:

It is claimed:

1. Apparatus for producing an interference pattern comprising means including a source of monochromatic coherent light for providing a pair of collimated coherent monochromatic light beams directed at an acute angle to each other toward a common point, and means for providing two closely spaced apparent light sources comprising a spreading lens positioned to intercept the light beams and having its primary focal point at the common point for spreading the beams in overlapping manner to provide a zone of light interference.

2. Apparatus for producing an interference pattern comprising a monochromatic coherent light source for producing a collimated beam of light, a beam splitter in the light beam for producing second and third light beams, a mirror in the path of the third beam to reflect it toward a point aligned with the second beam, and means for providing two closely spaced apparent light sources comprising a spreading lens in the path of the second and third beams having its primary focal point at the said point defined by the second and third beams for spreading the beams in overlapping manner so that light interference occurs in the overlapping area.

3. Apparatus for producing an interference pattern of adjustable fringe spacing comprising means including a source of monochromatic coherent light for producing a pair of collimated coherent monochromatic light beams directed at an acute angle to each other toward a common point, means for adjusting the angle between the light beams, and means for providing two closely spaced apparent light sources comprising a spreading lens positioned to intercept the light beams and having the primary focal point thereof at the common point for spreading the beams in overlapping manner to provide a zone of light interference, the spacing of the resulting interference fringes being a function of the angle between the light beams.

4. Apparatus for producing an interference pattern of adjustable fringe spacing comprising a base a pair of arms each pivotally supported at one end on the base and means interconnecting the arms for effecting simultaneous angular adjustment of the arms in opposite angular directions a spreading lens adjustably mounted on the base, a laser for producing a first collimated beam, a beam splitter mounted on a free end of one of the arms and in the laser beam for splitting the beam into second and third beams, the second beam being directed toward the primary focal point of the lens, a mirror mounted on a free end of the other of the arms and positioned to reflect the third beam toward the primary focal point of the lens, the lens therefore providing two closely spaced apparent light sources when so aligned with the second and third beams, and means for adjusting the lens along its principal axis according to movement of the arms so that the primary focal point of the lens will remain aligned with the second and third beams, whereby the lens combines and spreads the second and third beams in an overlapping manner to provide a zone of light interference, the spacing of the resulting interference fringes being variable according to the angular positions of the arms.

* * * * *